Jan. 3, 1967     J. W. HOCHMUTH     3,295,728

GRAVEL HOPPER MANUEL DUMP

Filed June 10, 1964

INVENTOR

JOSEPH W. HOCHMUTH

United States Patent Office 3,295,728
Patented Jan. 3, 1967

3,295,728
GRAVEL HOPPER MANUAL DUMP
Joseph W. Hochmuth, Musselshell County, Mont.
(Roundup, Mont. 59072)
Filed June 10, 1964, Ser. No. 374,087
1 Claim. (Cl. 222—166)

This invention relates to concrete mixing operation, and more particularly to a hopper that holds the materials before the mixing operations.

The object of the invention is to provide a hopper, which gravel, sand, and cement can be put in, while the cement mixer is still mixing and then when the mixer is emptied, the gravel, sand and cement is ready to be dumped into the mixer.

One advantage is that it is manually operated, by releasing a catch and raising up on the handle of the hopper, slowly, the gravel and mixture can be dumped into the cement mixer as desired.

Another advantage is that it sets on a truck bed with the sacks of cement close to the hopper and with a power loader to scoop up the gravel to load the hopper with, this takes a big part of the work out of it and saves on the labor cost.

Still another advantage is that the base, supports and handle can be mounted on with bolts so that it can be crated for shipment in a much smaller space when disassembled.

Still another advantage is that it is light in weight and is easy to load on a truck or move around.

Figure 1:
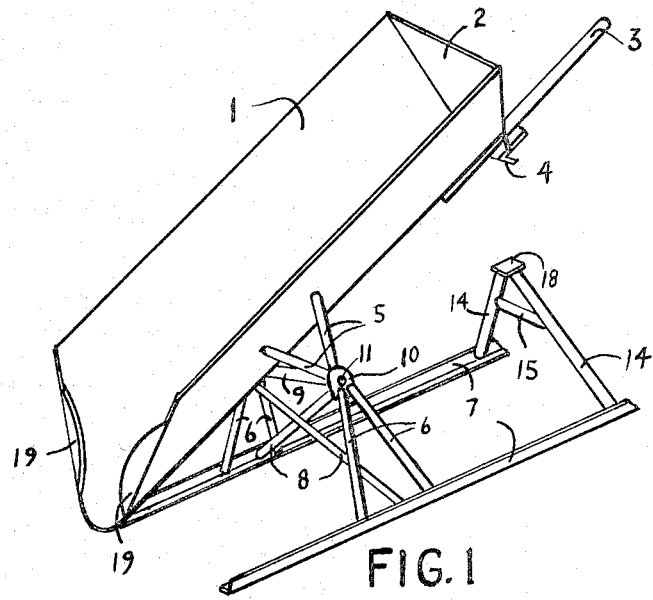
FIGURE 1 is a perspective view of the gravel hopper manual dump with the hopper partly tipped up to a dumping position.
Figure 2:
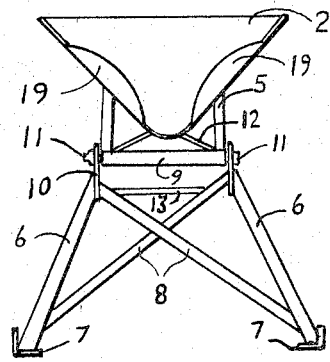
FIGURE 2 is the front view of the hopper which has a open end.
Figure 3:
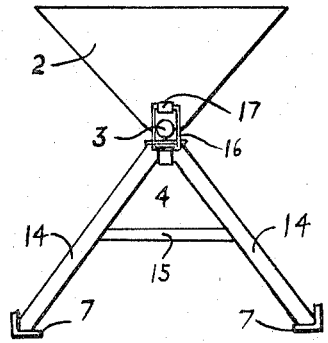
FIGURE 3 is the back view or handle end of the hopper.
Figure 4:
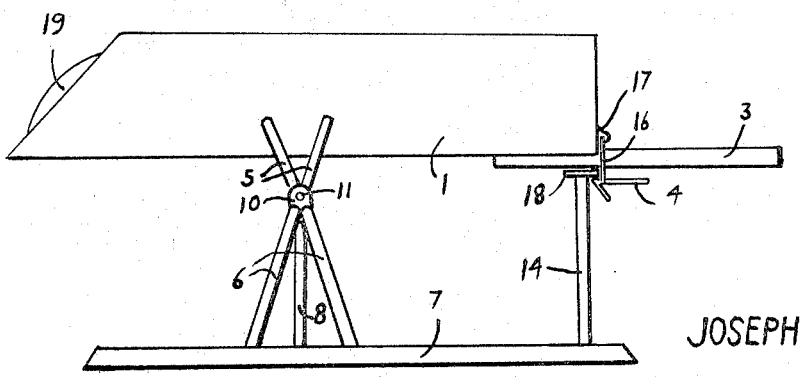
FIGURE 4 is the side view of the hopper.

Now a detailed description referring to the drawing, a gravel hopper manual dump made in accordance with the present invention is shown to include a long metal shaped with a rounded bottom and upwardly and outwardly sloping sides to form hopper 1 with the second end open with sides turned inwardly to form a spouted restricted dispensing passage 19 as shown in FIGS. 1 and 2. The first end has a metal end 2 welded in to close up the end, with a handle 3 made of pipe with the top edge of the pipe cut out and either welded or bolted to the back end of hopper below end 2 with the other part of pipe extending out to form the handle, as shown in FIG. 4. There are four hopper braces 5 which are fastened to the sides of the hopper and welded to a pipe 9 that runs crosswise under hopper as in FIGS. 2 and 4 to form part of the pivot. Two small braces 12 are welded on bottom of hopper and to the ends of pipe 9 to make it more rigid. The base consists of two angle irons support runners 7 which set on the ground or floor with four braces 6 either pipe or angle iron extending up as in FIGS. 2 and 4 with lower ends fastened to angle iron support runners 7 and upper ends fastened to two small plates 10 with a hole in each for a long bolt or rod 11 to extend through and through pipe 9 to form the pivot. There are two braces 8 which brace the braces 6 which are fastened to the plates 10 and to the runners 7, with a small brace 13 which is fastened on to the top of two braces 8 as in FIG. 2. The supports 14 as shown in FIGS. 3 and 4 are fastened at the bottom to the angle irons support runners 7 and at the top to a flat plate stop means 18 which extends back enough so releasable safety catch latch 4 will automatically catch each time it comes down, number 15 is a brace that braces hopper support 14, number 16 is a swinging link which catch latch 4 is welded to and 17 is a piece of metal curved to form a hinge for the lenk to swing in.

Now to explain the operation of this invention, by pressing up on the releasable safety catch latch 4 with the fore finger of one hand when grasping handle 3 with both hands, the latch 4 is released and the hopper is manually tipped up to empty the contents as desired through the spouted restricted dispensing passage 19.

Now to present my claim of what is now claimed as new and my own invention, to be protected by Letters Patent of the United States is:

A manual dump gravel hopper with a support means therefor comprising: said hopper formed with an elongate rounded bottom, upwardly and outwardly sloping sides, a first closed end and a second open end said open end provided with inwardly turned side wall portions forming a spouted restricted dispensing passage at said second and edge of said rounded bottom; said support means comprising two angle iron support runners rigidly connected together in a space parallel position in a plane by braces; said braces extending to a region substantially above said plane; pivot means at said region pivotably connecting said braces to approximately the longitudinal center of said hopper for rotation of said hopper above the axis of said pivot, said axis extending in a direction perpendicular to the direction of the runners and at a right angle to the longitudinal axis of said rounded bottom; said braces including a hopper support and stop means engaging the bottom of the hopper at the first closed end; a releasable safety catch latch latching the bottom of the hopper and said stop means together; handle means extending from said hopper closed end adjacent said releasable latch permitting release of the latch and pivoting of the hopper with both hands grasping the handle.

References Cited by the Examiner

UNITED STATES PATENTS

| 71,891 | 2/1868 | Chamberlin | 298—4 |
|---|---|---|---|
| 352,925 | 11/1886 | Mathews | 221—166 |
| 370,004 | 9/1887 | Bruner | 222—166 |
| 464,818 | 12/1891 | Dernell | 298—4 |
| 1,735,065 | 11/1929 | Walsh et al. | 298—38 |
| 1,986,864 | 1/1935 | Tolley | 222—166 |
| 2,036,115 | 3/1936 | Branch | 222—166 |
| 2,744,670 | 5/1956 | Bendot | 222—166 X |
| 3,198,395 | 8/1965 | McKinney | 222—166 |

FOREIGN PATENTS 24,663  6/1951  Finland.

ROBERT B. REEVES, Primary Examiner.
LOUIS J. DEMBO, Examiner.
N. L. STACK, Assistant Examiner.